United States Patent [19]  [11]  4,097,570
Dickson et al.  [45]  Jun. 27, 1978

[54] METHOD FOR MAKING PLASTIC ARTICLES

[75] Inventors: Andrew C. Dickson; Robert F. Kontz, both of Toledo, Ohio

[73] Assignee: Owens-Illinois, Inc., Toledo, Ohio

[21] Appl. No.: 677,095

[22] Filed: Apr. 15, 1976

[51] Int. Cl.² ............... B29C 17/02; B29C 17/07
[52] U.S. Cl. ............................ 264/296; 264/97; 264/98; 264/322; 425/525; 425/392
[58] Field of Search ............... 264/94, 296, 320, 322, 264/323, 97–99; 425/387, 387 B, 392, 393

[56] References Cited
U.S. PATENT DOCUMENTS

| 2,347,101 | 4/1944 | Harding | 425/392 X |
| 2,876,496 | 3/1959 | Murphy, Jr. | 264/322 X |
| 3,949,045 | 4/1976 | Hess et al. | 264/296 |
| 3,969,060 | 7/1976 | Rosenkranz et al. | 425/387 B |

FOREIGN PATENT DOCUMENTS

| 1,257,165 | 2/1961 | France | 264/320 |
| 1,309,935 | 10/1962 | France | 264/98 |

Primary Examiner—Jan H. Silbaugh
Attorney, Agent, or Firm—Richard D. Heberling; Myron E. Click; David H. Wilson

[57] ABSTRACT

A method for molding an end portion of a tubular thermoplastic parison prior to a blow molding operation to form a parison finish and an annular support flange. The method includes closing a laterally movable, sectional mold onto a circumferential section of a parison so that at least one end portion of the parison extends out of the mold. The extending end portion of the parison is then thermally conditioned to a deformable temperature and thereafter the parison is axially displaced to telescopically insert the thermally conditioned end portion within the mold into general radial alignment with annular, longitudinally spaced finish and support flange cavities. Next, an internal support is telescopically inserted within the thermally conditioned parison portion in preparation for the compression molding steps; which include axially displacing the opposed ends of the parison to force thermally conditioned, deformable plastic parison material radially outwardly into the flange and finish cavities.

8 Claims, 7 Drawing Figures

METHOD FOR MAKING PLASTIC ARTICLES

BACKGROUND OF THE INVENTION

This invention relates generally to a method for compression forming both a support flange and a finish on a thermoplastic parison. More specifically, the method relates to sequentially compressing the opposed ends of the parison while supported within a forming mold to sequentially form the finish and then the support flange.

Over the past several years it has become possible and commercially desirable to form blown plastic bottles of reduced wall thickness due to increased material costs and due to the advent of molecularly orienting the plastic materials. However, in some cases bottles formed of this greatly reduced wall thickness do not have a stacking strength that is comparable either to the previous, thicker bottles or to glass bottles. This has posed various problems, such as in filling and capping operations when the axial strength of the bottle is critical to prevent collapsing.

In an attempt to overcome these specific problems, bottles have been made with an annular neck support ledge which is grasped by various conveying and supporting devices so that the bottle can be pendently supported during filling and capping to take the axial load off the bottle during these operations. In fact, this particular arrangement has solved the collapsing problem. However, because of various problems encountered, the molding art has not heretofore provided a method and apparatus for forming both the bottle finish and the support flange in a single operation. One problem is a resistance of certain plastic materials to flow into both the finish forming cavity and the flange forming cavity in a single operation, thus leaving an incompletely formed bottle. This problem is accentuated with certain plastic materials, such as polyethylene terephtalate which crystallizes at elevated temperatures and thus cannot be heated to improve the flowability of the plastic during the compression molding operations.

SUMMARY OF THE INVENTION

The present invention overcomes these and other problems in the art by a method and apparatus that enable the sequential formation of a finish and a neck support ledge on a parison in a single molding operation.

In one of its broader aspects, the method of this invention includes positioning a thermally conditioned deformable parison portion in a mold in substantial radial alignment with annular, longitudinally spaced finish and support ring cavities. Next, one longitudinal end of a parison is supported while the other end is axially compressed to force at least a portion of the thermally conditioned, deformable plastic parison material into at least one of the annular, longitudinally spaced cavities. Then, the previously compressed end of the parison is supported while the previously supported end is compressed to force additional thermally conditioned plastic material into at least the other of the annular, longitudinally spaced cavities to complete the formation of the integral finish and support ring on the parison.

In a more limited aspect, the invention includes the steps of first positioning an essentially tubular plastic parison in a forming mold so that at least a portion of the parison projects out of the mold. The projecting portion is then placed in heat exchange relationship to a thermal conditioning source, such as a radiant heater, to adjust the temperature of the plastic material in the projecting parison portion to within a range capable of maintaining the essentially tubular configuration yet enabling deformation under compressive forces.

After the projecting portion of the tubular parison has been properly thermally conditioned, that portion is telescopically inserted into generally radial alignment with finish and support ring cavities in the mold in preparation for the compressive molding steps. The telescopic insertion is accomplished in the most preferred embodiment by a spring biased push rod which is a part of an axially movable compressive mandrel, the push rod being telescopically inserted freely into the tubular parison to engage the inner surface of a lower, closed, nondeformable, parison end portion. Further downward displacement of the push rod correspondingly displaces the parison (a) to place the external surface of the parison closed end against an axially movable end abutment and (b) to position the thermally conditioned parison portion in general radial alignment with the finish and support ring cavity.

Next, an internal support cylinder on the compression mandrel is telescopically inserted into the thermally conditioned portion of the parison to prevent internal collapse of the parison during the compression molding steps.

Next, an annular compression ledge on the compression mandrel engages the upper end of the parison and longitudinally compresses that end portion to force a portion of the thermally conditioned parison material into at least the finish cavity of the mold. During this first compression step, the axially movable end abutment is maintained in a fixed position to provide support for the closed end of the parison.

Finally, the end abutment is axially displaced toward the mandrel to force deformable plastic material radially outwardly into at least the support ring cavity to complete the molding operation. Thereafter, the thus-formed parison is removed from the forming mold for additional, optional thermal conditioning in preparation for a subsequent blow molding operation.

This method and apparatus, therefore, solve a previously existing problem in the art, namely the inability to completely and properly form a finish and a neck supporting ledge on a plastic article. This capability of the present invention, along with other meritorious features and advantages, will become more apparent from the following detailed description of the invention and the apppended claims.

DETAILED DESCRIPTION OF THE PREFERRED EMBODIMENT

Figure 7:
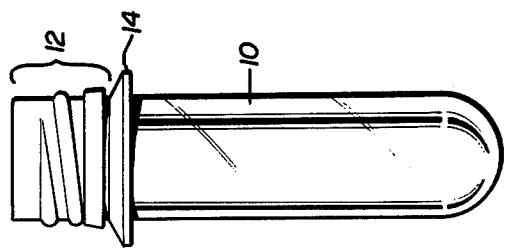
FIG. 7 is vertical elevational view of a parison with the integral compression molded finish and neck support ledge

Referring now more specifically to the drawings, the primary object of this invention is to form a finish 12 and a neck support ledge or ring 14 on a tubular thermoplastic parison 10 as illustrated in FIG. 7, the support ledge 14 being utilized in article handling operations to take vertical loads.

Figure 1:
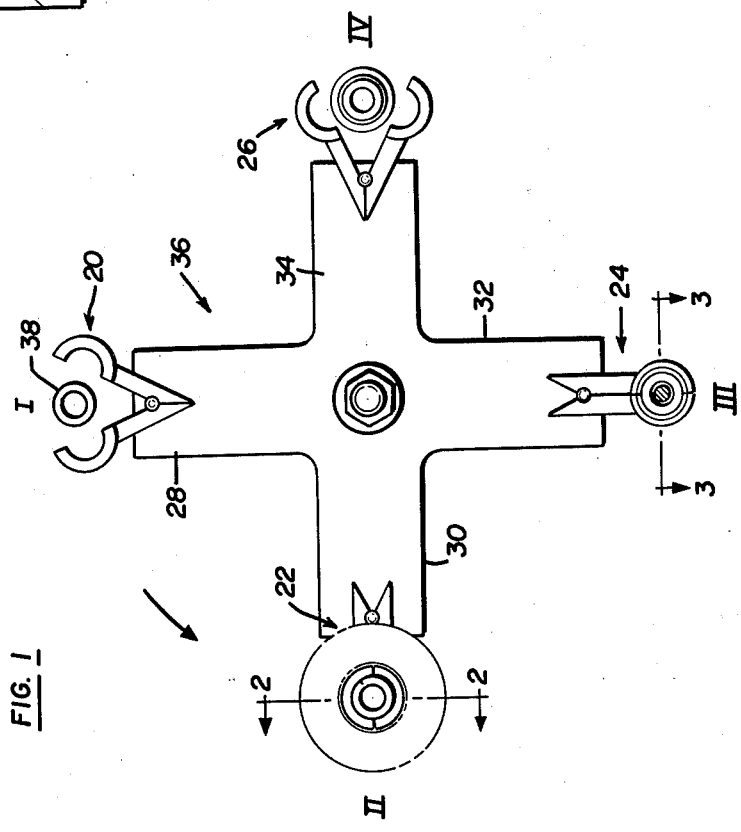
FIG. 1 is a top plan, schematic view illustrating a rotable turret having four radially arranged molds in four different stations in the finish and neck flange forming operation.

According the the invention, these parison components are formed preferably before a blow molding step by a molding apparatus shown in exemplary form in FIG. 1 and including sectional book type molds 20, 22, 24, and 26 that are pivotally secured to the end portions of respective radial arms 28, 30, 32, and 34 of a rotatable turret 36. With this arrangement, the molds are sequentially placed at a loading station I, a thermal conditioning station II, a compression molding station III, and an unloading or ejection station IV. As indicated, the rotatable turret 36 is rotated in a counter-clockwise manner by a suitable, conventional power means (not shown).

Figure 2:
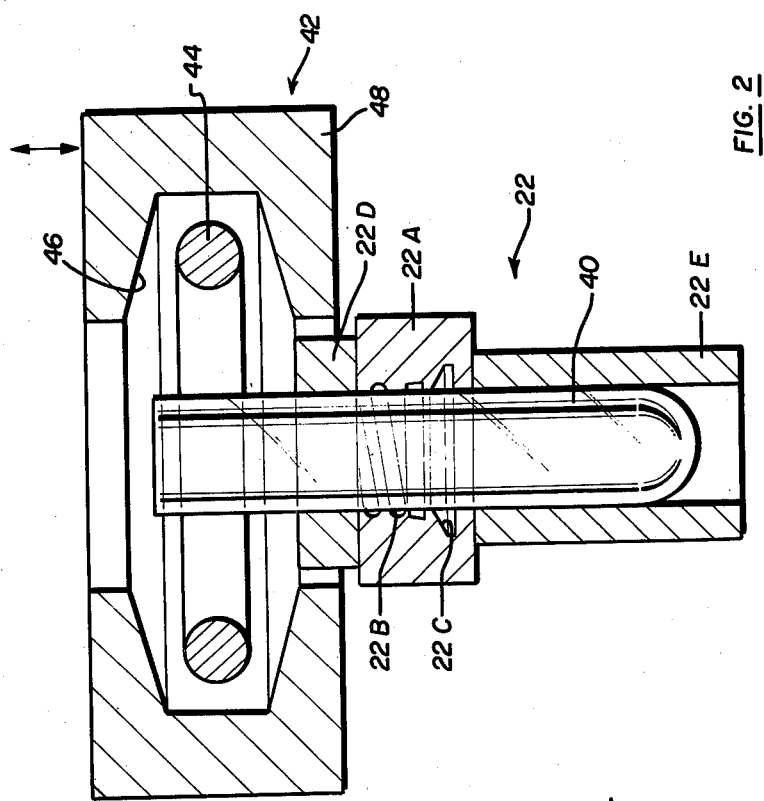
FIG. 2 is a vertical sectional view taken along plane 2—2 as indicated in FIG. 1, to illustrate a finish forming mold closed upon a parison and positioned at the thermal conditioning station.

The individual molds, per se, are identical and therefore may be understood by reference to FIG. 2, where mold 22 is illustrated at the thermal conditioning station II. Each of the molds include a pair of semicylindrical forming molds A, which collectively define annular, longitudinally spaced finish and support ledge cavities, as indicated by letters B and C, respectively. The finish cavity is shown as forming a threaded finish, but may optionally have a configuration to form a lip finish as is known in the art. Additionally, each mold section includes semi-cylindrical upper and lower support members, D and E respectively, which collectively define annular support rings to assist in grasping and stabilizing the parison during the compression molding operations.

Referring back to FIG. 1, the molding cycle is initiated by first positioning a parison, as indicated by reference numeral 38, between the opened sections of a mold at the loading station I. The parisons may be formed by conventional free-extrusion or injection molding techniques. As shown in FIG. 2, the parison is grasped at an intermediate portion so that at least a portion of the parison projects above the molds for subsequent thermal conditioning. Of course, the length of the projecting portion should be at least equal to approximately the axial length of mold segments A and D, as will become apparent in relationship to later discussions of the compression molding steps. Thereafter, the opened sections of the forming mold are closed by means (not shown) and the turret is rotated in a counter-clockwise manner to sequentially position the parison at subsequent stations.

Turning now more specifically to FIG. 2, mold 22 is illustrated at the thermal conditioning station II, where the upper, projecting portion of the parison 40 is thermally conditioned to a deformable temperature. The dwell time at the thermal conditioning station will vary based upon the heat absorption characteristics of the particular material, the heat output of the heating element at the conditioning station, and the temperature that must be reached so that the plastic material is deformable. As an example, polyethylene terephthalate should be heated to within a range from about 90° C to about 115° C so that the material is sufficiently deformable during the compression molding step, yet is still below its crystallization temperature.

In the disclosed embodiment, the thermal conditioning means is in the form of a vertically displaceable heater 42, including an annular heat source 44 suitably secured within a channel 46 of an annular support 48. The heating element 44 is preferably a radiant, infra-red heat source that is capable of heating the projecting end portion of the parison to a substantially uniform temperature throughout the parison wall thickness.

The heater 42 is vertically movable by suitable conventional means (not shown) to position the heater in two primary locations. The first location is as shown in FIG. 2 to locally heat the projecting circumferential section of the parison at Station II. The second location for the heater is above the position as shown in FIG. 2 so that the turret 36 may be indexed to sequentially position the radially arranged molds at the various forming stations.

After sufficiently and properly thermally conditioning the projecting end portion of the parisons at Station II, the heater 42 is displaced vertically upwardly and the thermally conditioned parison is displaced to Station III, where mold 24 is illustrated in FIGS. 1 and 3–6 in axial alignment with a compression molding assembly. That assembly is comprised of an axially movable compression mandrel 50 and axially movable end abutment 80, both members 50 and 80 being axially movable by appropriate conventional means (not shown).

Figure 6:
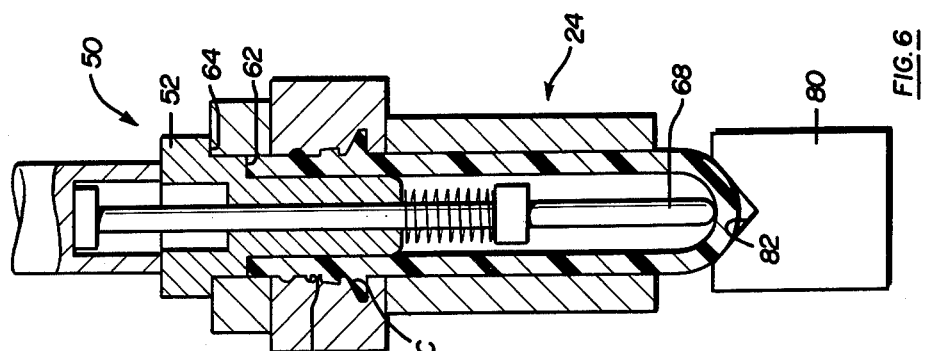
FIGS 4–6 are similar to FIG. 3, but illustrate various sequential phases of the compression molding operation.
Figure 5:
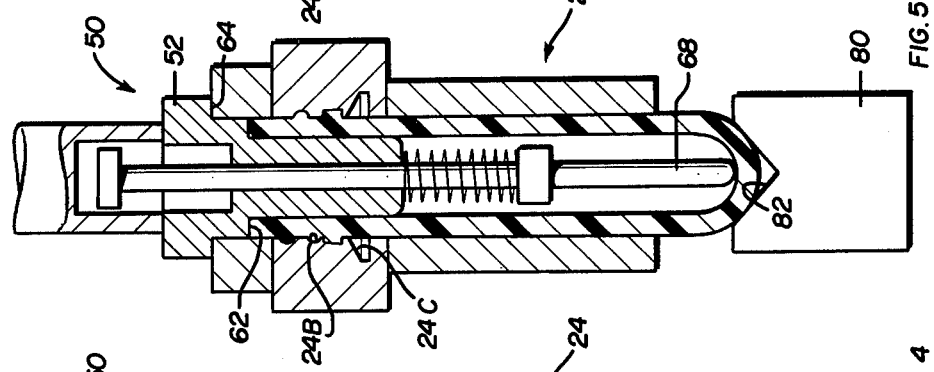

The compression mandrel 50 is comprised of a head 52 which is suitably secured to an axially movable displacement rod 54, each of these members having a recess 56 and 58, respectively, that collectively form an internal cavity for a purpose which will become apparent hereinafter. The head member 52 also includes an integral, essentially cylindrical internal support nose 60 that is inserted within the heated parison portion for internal support during the compression molding operations. Circumscribing the upper extremity of the support nose 60 is an annular compression ledge 62 which engages and compresses the upper annular open end of the parison. A secondary ledge 64 is vertically spaced from ledge 62 for abutment against the top of the upper support member D when the compression mandrel is at its lowermost position, as illustrated in FIGS. 5 and 6.

A through-bore 66 extends from recess 56 in head 52 downwardly through the center of internal support 60 to receive a push-rod 68 which is employed to axially displace the parison relative to the forming molds. An enlarged head 70 on the upper end of push-rod 68 limits the axial movement of the push-rod relative to the compression mandrel as will become apparent below. Additionally, a compression spring 74 is interposed between the lower end of internal support 60 and a bushing 72 that is suitably secured on an intermediate portion of the push-rod, the compression spring serving to downwardly bias the push-rod during the axial displacement of the parison relative to the forming mold.

The end abutment 80 includes a conical recess 82 to receive the domed, closed-end of the parison.

The steps of operation at the compression molding Station III are as follows. First, a forming mold, such as 24, is indexed by the rotatable turret into axial alignment with both the compression mandrel 50 and the end abutment 80, the compression mandrel 50, of course, being positioned well above that position shown in FIG. 3 to accommodate the lateral circumferential indexing movement of the forming molds and the turret.

Next, the compression mandrel 50 is displaced vertically downwardly to first telescopically insert the thermally conditioned parison section into general radial alignment with the finish and neck flange cavities and then to compression mold at least a portion of the thermally conditioned parison material into the finish cavity. This will be understood more readily by reference to FIGS. 3, 4, and 5.

Figure 3:
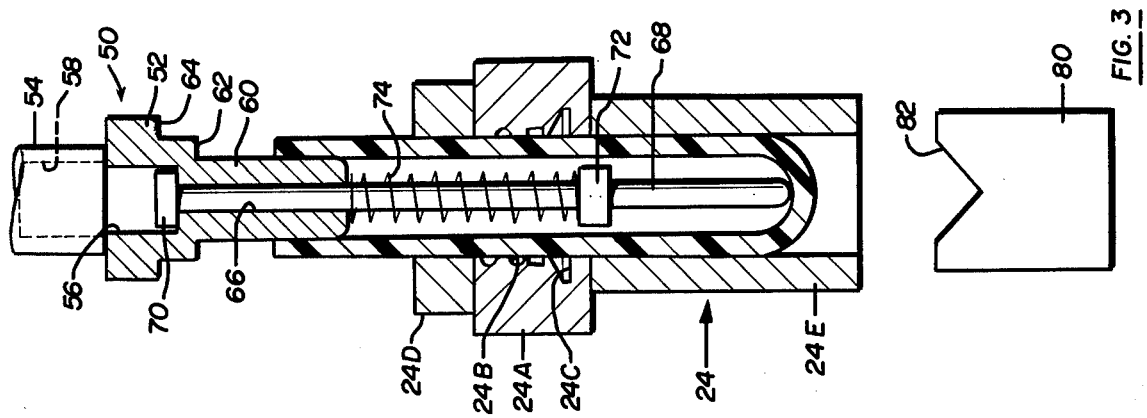
FIG. 3 is a vertical sectional view taken along plane 3—3 as indicated in FIG. 1, to illustrate the thermally conditioned parison as positioned at the compression molding station.

FIG. 3 illustrates the compression mandrel just as the lower end of the push-rod 68 engages the internal surface of the nondeformable, closed parison end. Additionally, it can be seen that the vertical dimension of the compression mandrel 50 is such that a longitudinal portion of the internal support nose 60 has been inserted into the upper, thermally conditioned parison end. Continued downward movement of the compression mandrel correspondingly displaces the parison downwardly until the external surface of the parison closed end bottoms against the conical recess 82 of end abutment 80. Continued downward movement thereafter results in displacing the internal support 60 fully into the opened end of the parison to the position illustrated in FIG. 4. During this latter phase of downward movement, the push-rod 68 is stationary and the remaining components of the compression mandrel therefore move relative to the push-rod under the compressive biasing force of compression spring 74.

Figure 4:
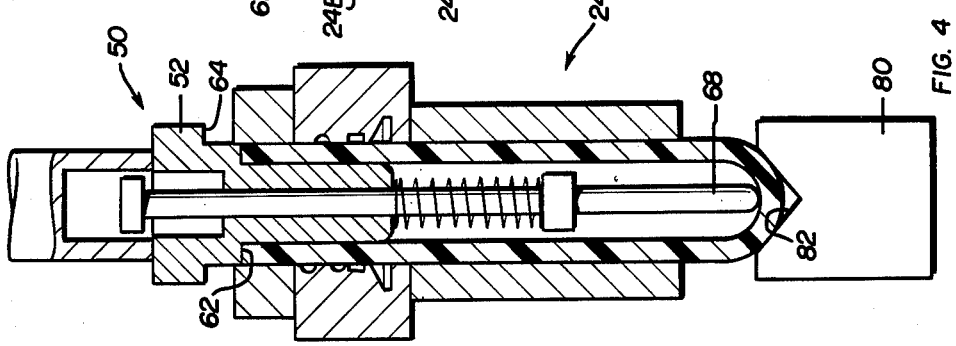

FIG. 4 illustrates the compression mandrel at the moment when (a) the thermally conditioned upper end portion of the parison has been generally radially aligned with the longitudinally spaced finish and neck support ring cavities, (b) the internal support nose 60 has been fully inserted into the upper, thermally conditioned section of the parison, and (c) the annular compression ledge 62 has first engaged the upper annular end of the parison. Further downward movement of the compression mandrel from the position illustrated in FIG. 4 displaces the extreme upper end of the parison downwardly and results in at least some degree of compression molding to force deformable plastic parison material radially outwardly into at least the finish cavity B.

FIG. 5 illustrates the compression mandrel 50 in its lowermost position where ledge surface 64 engages the top surface of upper support D. Also as shown in this Figure, plastic material has been forced radially outwardly to substantially fill the finish cavity due to surface 62 compressing the upper extremity of the parison downwardly into the forming mold. During the downward movement of the compression mandrel 50 from the position of FIG. 4 to the position of FIG. 5, end abutment 80 is maintained in a fixed position to prevent downward movement of the parison during the first phase of compression molding.

When the compression mandrel reaches the position of FIG. 5, upward movement of the end abutment 80 is initiated, for example by a suitably positioned limit switch (not shwon) that is tripped by mandrel 50. The end abutment is upwardly displaced to the position illustrated in FIG. 6 to complete the compression molding by forcing formable plastic material generally radially outwardly to fill the neck support cavity C, thus completing the compression molding operation. Also as shown by FIG. 6, the compression mandrel is not moved during the upward movement of end abutment 80 in order to provide support to the upper end portion of the parison during the second compression molding step.

Thereafter, the compression mandrel 50 is raised to retract push rod 68 to a clearance position above the forming mold. Simultaneously, the end abutment 80 is lowered to the position shown in FIG. 3. Next, the turret may be rotated to index the compression molded parison to unloading station IV, where the mold sections are opened and the parison is ejected for placement within a hopper or on a conveyor prior to being blow molded.

It is to be understood that the disclosed embodiment is merely exemplary of the overall invention, which is limited only by the following Claims. For example, the invention has been explained in reference to a parison having one closed end. For other types of parisons, an alternative vertical displacement component other than the push rod may be required. Additionally, the operation of the compression mandrel and the end abutment were described in terms of a sequential operation. This is desired only to completely position the thermally conditioned circumferential section of the parison fully within the forming mold prior to compression by the compression mandrel 50. However, this is optional and the two compressiosn steps by the compression mandrel 50 and the end abutment 80 may be simultaneous; for example, the two compression steps may be carried out simultaneously after the uppermost annular end portion of the parison is inserted within mold portion D. Further, the molds have been described in connection with a rotatable turret, but any other suitable arrangement may be utilized.

Having fully and completely described our invention, we now claim:

1. In a method of making a thermoplastic parison having an integral finish and an adjacent integral, annular supporting ring, the steps of: heating an end portion only of the parison to a deformable temperature; positioning the heated parison portion in a mold in general radial alignment with adjacent, annular, longitudinally spaced finish and supporting ring cavities; supporting one longitudinal end of the parison while axially displacing the other, remote parison end toward said one end to force at least a portion of the heated plastic material from said heated end portion of the parison outwardly into at least one of the adjacent annular, longitudinally spaced cavities; and then supporting the other remote parison end while axially displacing said one parison end to force additional heated plastic material from said heated end portion of the parison into at least the other of the adjacent, annular, longitudinally spaced cavities to complete the formation of the integral finish and adjacent supporting ring on the parison.

2. A method of forming an integral, annular support flange and an integral finish circumferentially surrounding an end portion of a generally tubular, elongated, thermoplastic article, comprising the steps of:
  1. gripping said article by the sections of a mold so that an end wall section extends out of the mold and thermally conditioning said end wall section to a deformable temperature;
  2. telescopically inserting said thermally conditioned article section into general radial alignment with a portion of said mold which includes an annular flange forming cavity longitudinally spaced from an annular finish forming cavity; and
  3. telescopically inserting an essentially cylindrical interior support into said article into general radial alignment with said mold, with the outer surface of the support closely conforming to the inner diameter of the tubular article such that the two confronting surfaces of the article and support are in essentially intimate contact during their telescopic assembly; and 4. compressing the opposed ends of the elongated article while said circumferential wall section is at a deformable temperature and while interiorly supporting said wall section with said interior support to force plastic material in said thermally conditioned section radially outwardly into said longitudinally spaced flange and finish cavities.

3. The method as defined in claim 2 characterized by the opposed ends of said article being compressed sequentially to sequentially force plastic material into the longitudinally spaced cavities.

4. In a method of compression molding a circumferential section of an essentially tubular, elongated plastic parison to form a finish and an adjacent annular supporting ledge adjacent an open end of the parison, the steps of:
surrounding a heated section of an elongated parison adjacent the parison open end with a forming mold including an annular finish cavity and an adjacent annular support ledge cavity;
compression molding the heated parison end section to form an integral finish and an adjacent annular, radially outwardly extending supporting ledge, by the sequential steps of (a) telescopically assembling an interior support and said heated tubular parison end section, the support conforming to the interior of said parison section, (b) compressing an annular surface on the open end of the parison in a first longitudinal direction while supporting the opposed, distant parison longitudinal end against movement to compress a portion of the heated parison section radially outwardly into the annular finish cavity, and (c) compressing the distant parison end in the opposed longitudinal direction while supporting the open parison end against movement to compress a portion of the heated parison section remote from said distant end radially outwarldy into the annular support ledge cavity.

5. The method as defined in claim 4 wherein said parison is comprised of polyethylene terephthalate, and further characterized by heating said parison to a deformable temperature in the range of between about 90° C and about 115° C.

6. In a method of compression molding a plastic tube to form adjacent, longitudinally spaced, annular configurations thereon, the steps of:
thermally conditioning a circumferential wall section adjacent one end of an elongated tube to a plastic deformable temperature;
telescopically inserting the thermally conditioned circumferential tube section into an essentially annular mold and radially aligning the thermally conditioned section with two longitudinally spaced, but adjacent annular mold cavities;
telescopically inserting a mandrel with a cylindrical support surface into the thermally conditioned tube section;
jamming one end of the elongated tube while supporting the other end of the tube to compress plastic material from said thermally conditioned tube section radially outwardly into at least one of said adjacent, longitudinally spaced, annular mold cavities; and then longitudinally jamming the other end of the elongated tube while supporting said one tube end to compress additional plastic material from said thermally conditioned tube section into at least the other of said adjacent longitudinally spaced, annular mold cavities,
the two jamming steps being performed by compressing the two remote ends of the elongated tube, yet resulting in the formation of the two adjacent annular configurations near one end of the tube.

7. In a method of forming a neck support flange and a finish adjacent an opened end of a tubular thermoplastic parison prior to a blow molding operation, the steps of:
1. closing a sectional mold onto an intermediate longitudinal portion of the parison between the open parison end and an opposed end so that said open parison end and at least a longitudinal parison section extends out of said mold;
2. thermally conditioning that section of the parison extending out of said mold to a deformable temperature;
3. engaging the parison at a position where the plastic material is nondeformable and axially displacing the parison to generally radially align at least a portion of the thermally conditioned section with annular, longitudinally spaced, finish and support flange cavities; and
4. sequentially displacing the two ends of the parison toward each other while interiorly supporting said section to substantially sequentially force plastic material radially outwardly into each of said longitudinally spaced cavities to form said finish and neck support flange, with each end being restrained against axial movement while the other end is displaced.

8. In a method of forming a threaded finish and a neck support ledge on an essentially tubular thermoplastic parison having an open end and a closed end, the sequential steps of:
1. placing the parison in a mold having an annular finish forming cavity longitudinally spaced from an annular neck support ledge cavity, the open end of said parison and an adjacent longitudinal section of said parison extending beyond the mold;
2. substantially uniformly heating that portion of the parison extending beyond said mold to a deformable temperature;
3. axially aligning the mold and the parison with (a) a support surface in alignment with the closed end of the parison and (b) a compression mandrel in alignment with the heated open end of the parison, the compression mandrel including a cylindrical nose insertable within the heated parison portion for internal support thereof, an annular surface circumscribing the supported end of the cylindrical nose for engaging the annular open-end of the heated parison, and a push rod extending from the nose for insertion within the parison to engage the internal surface of the closed-end portion thereof, said push rod being yieldably biased in a direction away from the nose and the movable axially relative to said cylindrical nose;
4. displacing the compression mandrel and (a) freely inserting the push rod into the parison to engage the internal surface of the closed end parison portion and thereafter displacing the parison axially with the push rod to radially align the heated parison portion with the finish forming cavity and the support ring cavity; (b) telescopically inserting the cylindrical support nose within the parison open end portion into general radial alignment with the heated parison section, (c) contacting the closed end of the parison with the support surface, (d) contacting the annular end of the parison with the annular mandrel surface, and (e) compressing the heated end of the parison by continued axial movement of the mandrel and forcing a portion of the heated parison radially outwardly into the finish forming cavity of the mold;

5. axially displacing the support surface toward the mandrel to compress the tubular parison from the closed end thereof to force a portion of the heated parison into the annular neck support ring cavity; and 6. removing the thus-formed parison from the finish mold.

* * * * *